No. 730,525. PATENTED JUNE 9, 1903.
L. H. EDGAR.
APPARATUS FOR BASTING MEATS, &c.
APPLICATION FILED MAR. 5, 1903.
NO MODEL. 3 SHEETS—SHEET 1.

WITNESSES:
F. J. Hartman
Harry Shields

INVENTOR.
Lambert Holland Edgar
BY
Chas. A. Potter
ATTORNEY.

No. 730,525. PATENTED JUNE 9, 1903.
L. H. EDGAR.
APPARATUS FOR BASTING MEATS, &c.
APPLICATION FILED MAR. 5, 1903.
NO MODEL. 3 SHEETS—SHEET 2.

WITNESSES:
F. J. Hartman
Craig Shields

INVENTOR.
Lambert Holland Edgar
BY
Chas. A. Cutter
ATTORNEY.

No. 730,525. PATENTED JUNE 9, 1903.
L. H. EDGAR.
APPARATUS FOR BASTING MEATS, &c.
APPLICATION FILED MAR. 5, 1903.
NO MODEL. 3 SHEETS—SHEET 3.
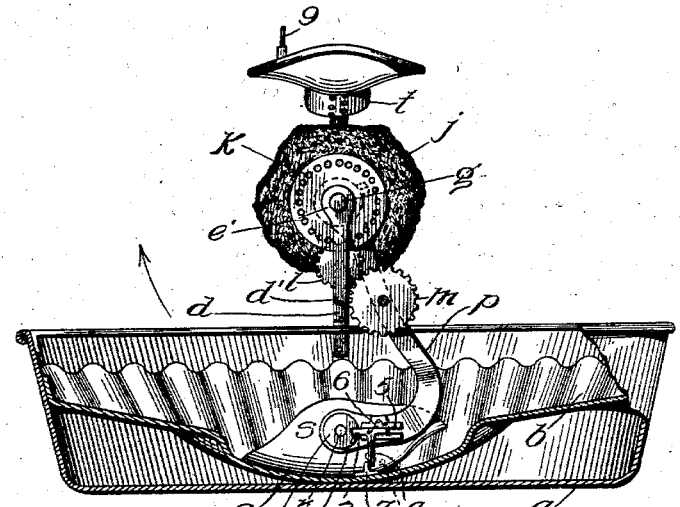
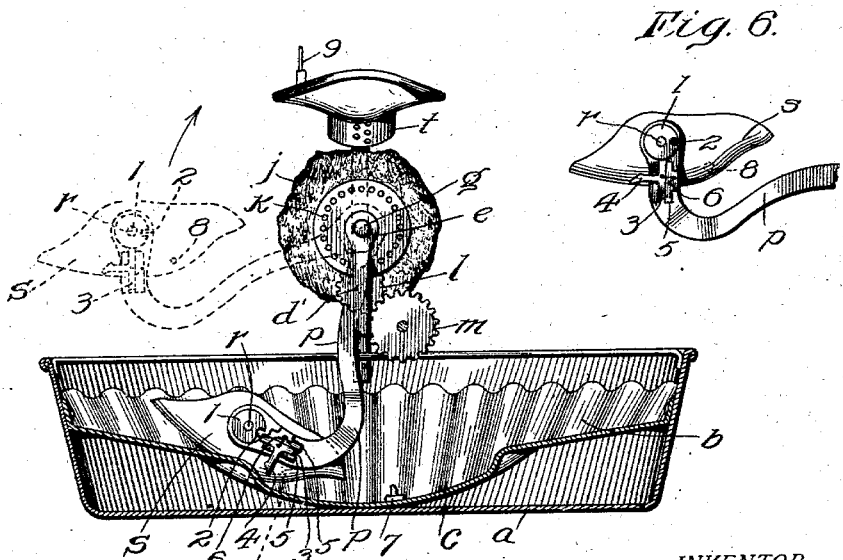
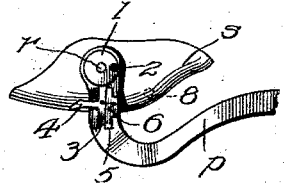
WITNESSES: INVENTOR.
Lambert Holland Edgar
BY Chas. A. Rutter
ATTORNEY.

No. 730,525. Patented June 9, 1903.

UNITED STATES PATENT OFFICE.

LAMBERT H. EDGAR, OF PHILADELPHIA, PENNSYLVANIA.

APPARATUS FOR BASTING MEATS, &c.

SPECIFICATION forming part of Letters Patent No. 730,525, dated June 9, 1903.

Application filed March 5, 1903. Serial No. 146,291. (No model.)

*To all whom it may concern:*

Be it known that I, LAMBERT HOLLAND EDGAR, a citizen of the United States, and a resident of the city and county of Philadelphia, State of Pennsylvania, have invented certain new and useful Improvements in Apparatus for Basting Meats, Fowls, &c., of which the following is a specification.

My invention relates to improvements in apparatus for basting roasting meats, fowls, &c.; and the object of my invention is to furnish an apparatus for basting in which the meat or fowl will be automatically turned and basted during the process of roasting.

Figure 1:
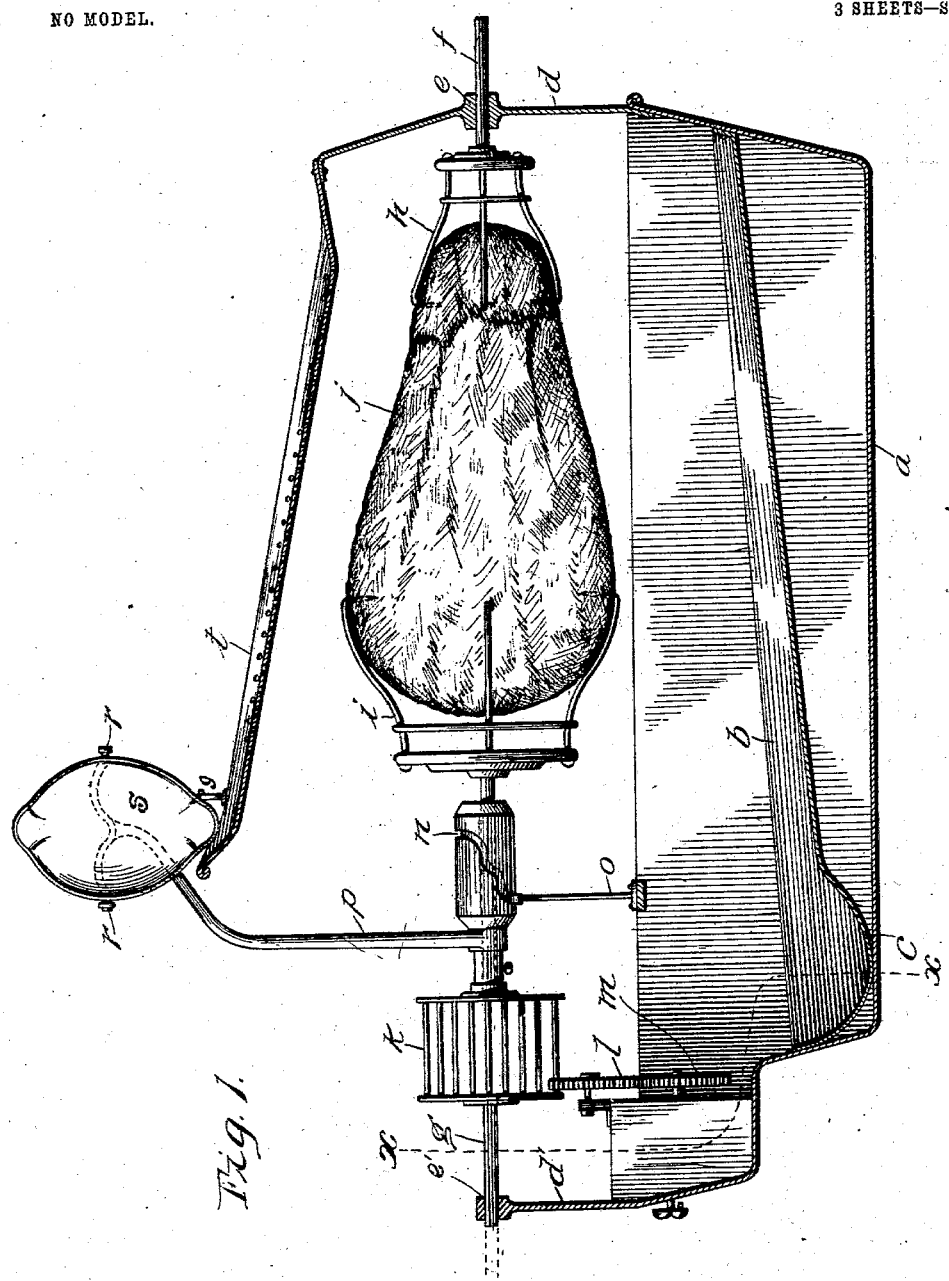
Figure 2:
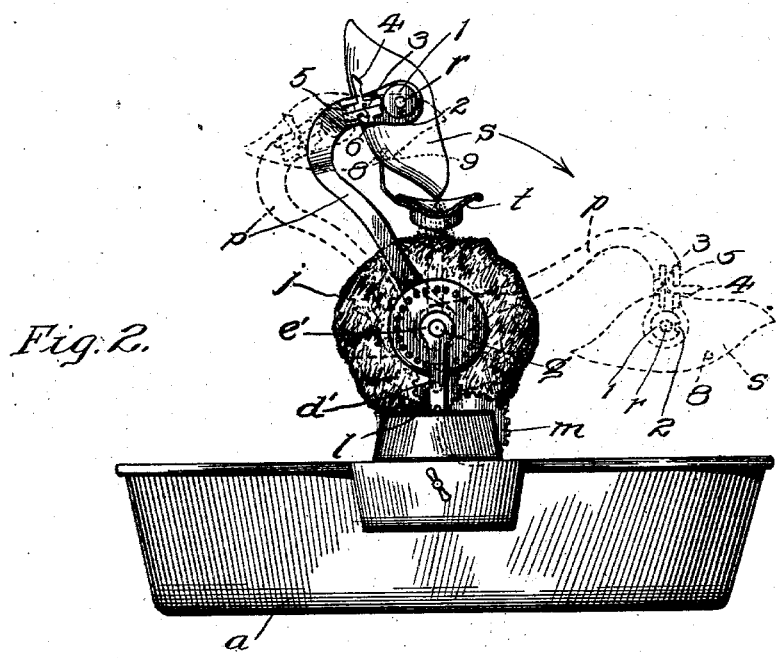
Figure 3:
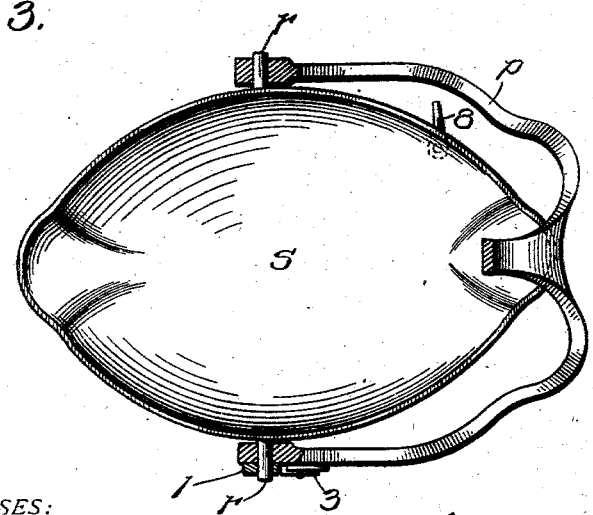

In the accompanying drawings, forming part of this specification, and in which similar letters of reference indicate similar parts throughout the several views, Figure 1 is a side elevation, partly in section, of my apparatus for automatically turning and basting meats or fowls during roasting; Fig. 2, a front elevation of Fig. 1; Fig. 3, an enlarged plan of the basting-spoon; Fig. 4, a section of Fig. 1 on line X X, showing the basting-spoon at its lowest point; Fig. 5, a similar view, the basting-spoon being moved slightly forward; Fig. 6, a side elevation of the basting-spoon in a partly-raised position.

$a$ is a pan, preferably furnished with an inclined removable false bottom $b$, the lower end of which is furnished with a gutter or well $c$ for collecting the gravy.

$d\ d'$ are upright frames, forming part of or carried by the pan $a$, which carry bearings $e\ e'$, in which the short shafts $f\ g$ are journaled. At their inner ends the shafts $f\ g$ carry clasps or fasteners $h\ i$, which are adapted to engage and hold opposite ends of the meat or fowl $j$. Upon shaft $g$ is a cage or very broad faced gear-wheel $k$, which is adapted to be engaged and rotated by the teeth of a gear $l$, which is driven through a gear $m$, forming part of the train of clockwork, of any well-known form, or which may be driven in any other suitable manner.

Upon one of the shafts $f\ g$ is a cam $n$, Fig. 1, which is engaged by a stationary pin $o$, carried by the pan $a$. As the shafts and meat are rotated the cam $n$ and pin $o$ cause them to be simultaneously reciprocated, the cage or broad-faced gear $k$ permitting this movement.

Fast to one of the shafts $f\ g$ is an arm $p$, the upper end of which is preferably bifurcated and furnished with bearings to receive the trunnions $r$, which are carried upon the sides of a spoon or bailer $s$. $t$ is an inclined trough furnished with a perforated bottom, which is placed directly over shafts $f\ g$ and the meat or fowl $j$. This trough is attached to the pan $a$ or to the upright $d$, carried by this pan, in any suitable manner.

As the shafts $f\ g$ are rotated the arm $p$ and spoon $s$ are carried around the latter at each revolution, dipping into the gravy in the well $c$ and carrying up and discharging it into the trough $t$, through the perforated bottom of which it falls upon the meat or fowl $j$, and from thence to the inclined bottom $b$, down which it runs to the well $c$.

In order that the spoon $s$ may properly enter the gutter or well $c$, it is furnished with a locking device which locks it to the arm $p$ before it reaches the gutter and which is unlocked before it leaves the well. This device is as follows: 1 is a collar fast upon one of the trunnions $r$ of the spoon $s$. 2 is a notch in this collar. 3 is a keeper furnished with a projecting finger 4, which is carried in guides 5, carried by arm $p$.

The spoon is so hung that it normally takes a vertical position, as shown in Fig. 6. As it leaves its highest position and is moved down toward the pan $a$ the notch 2 in the collar 1 presently is brought opposite the keeper 3, which is then by the spring 6 shot into the notch, locking the spoon to the arm $p$, as shown in Fig. 4, which is the proper position for the spoon upon entering the well $c$. The spoon having entered the well and being filled with gravy, the finger 4 upon the keeper 3 is engaged by a detent 7, Figs. 4 and 5, which as the arm $p$ is advanced detains the keeper until the notch 2 in collar 1 has been moved away from it, when the finger passes over the detent, and the keeper is released. In the meantime the notch has been so moved by the righting of the spoon that it is not again engaged by the keeper until just before the arm $p$ again is near the lowest point of its stroke. As the arm $p$ is raised the spoon lifts the gravy which it has scooped up in its passage through well $c$ until a pin 8, carried on its side, engages a stop 9, carried by the trough *t*. This causes the spoon to tilt, as shown in Fig. 2, and to discharge its contents into the trough *t*.

The apparatus is designed to be placed in an ordinary oven. The clockwork being wound up, the turning and basting of the meat proceeds without intermission until the clockwork ceases to run or until the meat is cooked and withdrawn.

The turning and reciprocating of the meat insures a more even basting than would the turning alone.

Having thus described my invention, I claim as new and desire to secure by Letters Patent—

1. In an apparatus for basting meats, &c., in combination, a pan, means for carrying, means for rotating and means for reciprocating the meat, and means for automatically lifting and pouring gravy upon the top of the meat.

2. In an apparatus for basting meats, &c., in combination, a pan having an inclined bottom and a well at one end, means for carrying, means for rotating, and means for reciprocating the meat, an inclined trough with a perforated bottom above said meat-carrying means, and means for lifting gravy from the well in the bottom of said pan and for discharging it into the upper end of said trough.

3. The combination of the dripping-pan having a well at its lower end, the meat-carrying shafts and means for carrying and means for rotating the same, and the inclined trough with perforated bottom for distributing the gravy, of an arm carried by one of said shafts, a spoon pivotally carried by said arm, means for locking said spoon to said arm before entering the well in the dripping-pan, means for unlocking said spoon from said arm before said spoon leaves said well, and means for tilting said spoon for causing it to empty its contents into said trough.

4. In combination, the spoon-carrying arm, the spoon, trunnions on said spoon carried in bearings carried by said arm, a notched disk carried by one of said trunnions, a keeper furnished with a projecting finger carried by said arm adapted to engage said notch, a spring for throwing said keeper into said notch, and a stationary stop adapted to engage said finger to withdraw said keeper from said notch.

5. In combination, the rotating arm, the spoon pivotally carried by the outer end of said arm, a stop on said spoon, the inclined trough with perforated bottom, and a stop carried by said arm, adapted to engage the stop carried by said spoon in order to cause the latter to discharge its contents into said trough.

LAMBERT H. EDGAR.

Witnesses:
GEORGE W. SELTZER,
CHARLES A. RUTTER.